United States Patent [19]

Stricker

[11] Patent Number: 5,513,807
[45] Date of Patent: May 7, 1996

[54] METHOD OF AND APPARATUS FOR COLLECTING AND TREATING REFUSE CONTAINING STRETCHED PLASTICS

[75] Inventor: Urban Stricker, Siegen, Germany

[73] Assignee: Rosa Emilia Fleischhauer, Berlin, Germany

[21] Appl. No.: 256,953

[22] PCT Filed: Jan. 22, 1993

[86] PCT No.: PCT/EP93/00139

§ 371 Date: Jul. 27, 1994

§ 102(e) Date: Jul. 27, 1994

[87] PCT Pub. No.: WO93/14915

PCT Pub. Date: Aug. 5, 1993

[30] Foreign Application Priority Data

Jan. 27, 1992 [DE] Germany .................... 42 02 095.6
Jun. 24, 1992 [DE] Germany .................... 42 20 665.0
Aug. 18, 1992 [DE] Germany .................... 42 27 308.0

[51] Int. Cl.$^6$ .................... B02C 21/00; B02C 23/10; B02C 23/18
[52] U.S. Cl. .................... 241/23; 241/24.18; 241/29; 241/65; 241/79; 241/152.2; 241/236; 241/DIG. 38
[58] Field of Search .................... 241/14, 23, 24, 241/29, 65, 79, 79.1, 100, 152.2, 230–234, 236, DIG. 38

[56] References Cited

U.S. PATENT DOCUMENTS

| | | |
|---|---|---|
| 2,879,005 | 3/1959 | Jarvis .................... 241/14 |
| 3,814,240 | 6/1974 | Laundrie . |
| 3,883,624 | 5/1975 | McKenzie . |
| 4,033,804 | 7/1977 | Baldyga . |
| 4,199,109 | 4/1980 | Watanabe .................... 241/14 |
| 4,340,076 | 7/1982 | Weitzen .................... 241/23 X |
| 4,374,573 | 2/1983 | Rouse . |
| 5,100,063 | 3/1992 | Bauer .................... 241/14 |
| 5,110,055 | 5/1992 | Teeny .................... 241/23 X |

FOREIGN PATENT DOCUMENTS

| | | |
|---|---|---|
| 0493018A1 | 7/1992 | European Pat. Off. . |
| 2307635 | 11/1976 | France . |
| 1268813 | 5/1968 | Germany . |
| 2546097 | 4/1977 | Germany . |
| 2611980 | 9/1977 | Germany . |
| 3601175A1 | 7/1987 | Germany . |
| 4004300A1 | 8/1991 | Germany . |
| 1313203 | 4/1973 | United Kingdom . |

Primary Examiner—Timothy V. Eley
Attorney, Agent, or Firm—Herbert Dubno

[57] ABSTRACT

Refuse containing stretched plastic is collected at each of a plurality of collection locations and is there comminuted and, before or after this comminution, is heated to a relaxation temperature of at least a portion of the stretched plastic thereby embrittling and reducing the volume of this portion. Then batches of the thus comminuted and at least partially embrittled and volume-reduced refuse are transported to a single treatment location. Here the batches of preprocessed refuse are mixed with each other and if desired with unprocessed refuse, and the mixture is sorted and comminuted again.

13 Claims, 3 Drawing Sheets

METHOD OF AND APPARATUS FOR COLLECTING AND TREATING REFUSE CONTAINING STRETCHED PLASTICS

CROSS REFERENCE TO RELATED APPLICATIONS

This application is the US national phase of PCT application PCT/EP93/00139 filed 22 Jan. 1993 with a claim to the priorities of German applications P 42 02 095.6, P 42 20 665.0, and P 42 27 308.0 respectively filed 27 Jan. 1992, 24 Jun. 1992 and 18 Aug. 1992.

FIELD OF THE INVENTION

The invention relates to a method of and apparatus for collecting and treating refuse containing stretched plastics according to the following steps:
a) the refuse is reduced by a cutter such as a two-shaft cutter or shredder in a first comminution stage to a volume-reduced particle mixture;
b) the mixture is run through a heating stage before or after the comminution stage to subject it to a selective heating to the relaxation temperature of a part of the stretched plastics in the particle mixture and this targeted plastic part is thus reduced in volume and embrittled;
c) thereafter the fraction of shrunk and embrittled plastic particles is sorted and at least a further fraction of unshrunk particles of one or more other types of plastics along with a remaining fraction of foreign material such as paper etc., is subjected to a comminution into cut particles and
d) the fractions of step c) are separated and sorted by running through a specific separating and sorting apparatus.

BACKGROUND OF THE INVENTION

Japanese patent document 61-94705 describes a method of regenerating and recycling polystyrol granules from refuse containing polystyrene foam, where this refuse is heated enough that it almost melts, thereby reducing its volume substantially and greatly condensing it so that the material can be comminuted in a crusher. A modifier containing anorganic components such as lime or clay, aluminum hydroxide, wood chips, rubber, or plastic is mixed with polystyrene granules or polystyrene-resin powder. The mixture is pelletized by means of an extruder to recover polystyrene resin. This process is extraordinarily expensive and produces a very mixed end product whose further use is very limited in particular because of the high costs of the treatment method.

Japanese patent document 21-1307 describes an apparatus for improving the quality of a reusable product of foamed polystyrene refuse. The refuse is cut by electrically heated wires into small pieces and these are dropped for shrinking into a container where they are defoamed with low-pressure steam at a temperature between 120° and 160° C. and pressures between 3 and 6 bar and are reduced in volume. Then the product is fed to a mill and is ground to particles with a particle size between 10 and 30 mm.

German patent document 1,268,813 describes a machine for mixing and plastifying thermoplastic resins which has a mixing drum provided with a fast-moving mixer and in which the plastification takes place exclusively from the frictional heat generated in the mixer. The mixing machine is provided with a comminuter for polyvinyl chloride films or for particular polyvinyl chloride refuse. A selective comminution of refuse containing different types of plastics is not possible with this machine.

The publication "Kunststoffe" (80; 1990, 3, Carl Hanser Verlag, Munich 1990, page 310) discusses the direct recycling of refuse during the manufacture of films." It states that production is not possible without refuse. It is therefore important to act directly on production refuse before it has a chance to get dirty. With plastic film this is particularly important because the production costs are largely dominated by the material costs. The possibility of recycling edge trimmings and rejected film is described in the cited passage. This procedure relates to a particular type of refuse recycling intimately related to the production of plastic films. This makes it to a degree possible to seek a machine solution and is therefore not applicable to the recycling of unsorted and partly dirty plastic refuse as is produced in the sector of private households and chain businesses and the like in connection with packaging trash.

British patent document 1,313,203 describes a method and apparatus for condensing particles of plastic foam. They are fed onto a vibrating cold surface which moves them through a heating area so that they collapse and partially fuse together but do not stick to the transport surface. The cooked-together mass is fed between a pair of cooled compression rollers and is thereby reduced to a consistency of 400 g/l. Then for further use cylindrical pellets are created by extrusion with a density of 560 g/l. This method is limited to treating thermoplastic hard-foam particles and necessitates a careful presorting out from the refuse of particles that come from the dismantling of vehicles, machines, or big packages. The method is not applicable for use in a wide range of refuse as is found for example in business or in the private sector.

German patent document 3,601,175 describes a method and apparatus for separating various polymers out of a mixture of polymers. The method is based on the recognition that due to their nearly identical densities it is impossible in recycling plants to separate fractions of polypropylene and polyethylene from each other by a hydrocyclone sorting. In addition it has always been known that with the standard process for separating out and recovering thermoplastic resins from plastic garbage it is known to use staged different temperatures but the problem of separating the melted from the still foamed parts has no solution as yet.

The known process proposes, in order to separate from mixed polymers of small particle size polymers of roughly the same density but with different melting points, to load this mixture into a fast mixer and to plastify it by friction or heating the device to agglomerate the polymer particles with the lowest melting point, then to go to a cool mixer and then cool them into an agglomerate and separate out the unformed particles. Such a device has a fast mixer for heating the mixture to be separated, followed by a cool mixer whose output is connected to an air classifier which can be constituted as a known diffusor or impact separator or zig-zag sifter or flow reversing sieve. For the impact separation the polymer mixture is blown from a nozzle against an impact wall and over a sequence of recipients.

This method and apparatus are only applicable for use in an industrial setting and are only practical when used a lot.

German patent document 4,004,300 describes a method and apparatus for separating different plastic products. These are comminuted as is known, cleaned, and dried. The dried particles are fed to a heated movable support onto which the plastic particles with the lowest melting point stick and the particles with the higher softening point move along and can be separated. After the separation out of these particles the sticking particles are scraped from the steel belt.

This process and the necessary equipment require a great deal of regulated machinery that maintain specifically determined temperatures so that the installation is only operable in highly technical industrial settings. In addition the plastic particles must be cleaned before the treatment and comminuted and then put in a uniform thin layer on the heated support in order to avoid mistakes in the sorting. At the same time it is impossible to prevent that different plastic fractions treated by the known process contain a high portion of the wrong materials.

U.S. Pat. No. 4,374,573 describes a mobile apparatus for shredding refuse, in particular old tires. The shredder has several cylindrical cutter rollers with a plurality of cutter blades which rotate oppositely and which overlap. Means for further treating the comminuted rubber waste is not discussed.

U.S. Pat. No. 4,033,804 describes a method of and apparatus for recycling plastic refuse, in particular for treating molecularly stretched plastic containers. In one method for degluing adhered labels the plastic articles are heated about to the glass temperature and are thereby shrunk so that the labels separate from the shrunk plastic parts. The shrinkage amounts to at least 5%, preferably between 25 and 125% of the surface of the labeled article. Longer heating produces a further shrinking of the plastic parts. Further method steps for recycling the label-free plastic parts are not discussed in the document.

U.S. Pat. No. 3,814,240 describes a method of transporting a mixture of paper refuse with thermoplastic foil parts into a hot-gas stream. The method is aimed at the separation of paper and thermoplastic film refuse by the contraction of their specific surfaces to such an extent that the separation of the contracted plastic particles from the paper mixture can be achieved by standard mechanical methods, for example by air classifying or sifting. The method uses a feed conveyor, a hot-air producer, and a drying drum in which the mixture is heated to shrink the plastic parts. The thus treated articles are separated in a cyclone from the hot gas stream and are separated in an air classifier into heavy shrunk plastic particles and lighter paper waste. Discussion about a further treatment of these separated products is not found in the named document.

U.S. Pat. No. 3,883,624 describes a method of and apparatus for recycling foamed thermoplastic polymer refuse during the production of foamed thermoplastic plates. The refuse produced during the production of thermoplastic foam plates is ground up and fed onto a steel conveyor belt. As it moves through a heating zone at first it is melted and shrunk and then in a cooling zone it is subsequently embrittled, ground up, and finally mixed with fresh plastic granules. In this manner a 100% refuse-free reuse of the plastic production material is achieved.

German patent document 2,546,097 describes a method for treating the plastic refuse of if necessary presorted refuse. Such refuse materials can contain, in addition to plastic, specific light foreign materials such as textile or wood particles, kitchen refuse and the like. The described method is comprised of the following steps:

a) comminution of the refuse;
b) heating of the pretreated refuse from step a) so that the plastic fraction of the refuse agglomerates and condenses, and
c) cooling the pretreated refuse from step b) so that the agglomerated and condensed plastic fraction is reduced to granules.

Then the pretreated refuse from step c) is separated in an inertial air classifier to separate out the foreign materials not embedded in the granulated plastic particles.

This method requires quite a bit of machinery so that it can only be logically used in a central treatment plant, not however in outside collection locations for example supermarkets or collection locations in the region of smaller communities or living areas. In addition the sorting of different types of plastics by the known method requires a substantial investment and energy so that its use is limited to large-scale commercial operations.

Stretched thermoplastics are used in plastic technology in many areas. They include above all the product group of fibers, films, foams, deep-drawn parts, blown bodies, and molded parts. A general characteristic of stretched thermoplastics is an orientation of the molecular chains. This orientation is created when the product is created by deformation procedures in the melting region or when cooled for example with fibers during spinning and stretching.

The discarded refuse products containing stretched thermoplastics are a particular problem in many cases because of their disadvantageous ratio of volume to weight, that is they take up a lot of space and weigh little. This affects handling them when collecting them for recycling as well as for treating and working on them in the recycling process. When dealing with foams and fibers these disadvantages are particularly noticeable.

Stretched thermoplastics relapse when heated to the condition they were in before being stretched, that is the stretched molecule chains relax back to nonstraight shape. The temperature region for this relaxation starts below the melting point of the thermoplastics. This means that this shrinking takes place before melting of the thermoplastics virtually without emitting anything.

In most cases the relaxation of the thermoplastics is accompanied by a drastic reduction of their elasticity which produces after cooling a notable brittleness.

When sorting plastic masses which are derived from the packing field there is the problem of plastic bonded to other materials. For example paper or cardboard, wood, or the like is frequently stuck to the plastic refuse.

OBJECTS OF THE INVENTION

It is an object of the invention to provide a method and apparatus for collecting and treating refuse containing stretched plastic which is particularly intended to take in many different types of plastic trash and to conduct an efficient recycling while avoiding the above-given disadvantages and technical limitations.

Another object is to make it possible to collect small quantities of refuse, for example in a business or from presorted household trash, for a commercially viable recycling system.

SUMMARY OF THE INVENTION

According to the invention refuse containing stretched plastic is collected at each of a plurality of collection locations and is there comminuted and, before or after this comminution, is heated to a relaxation temperature of at least a portion of the stretched plastic, thereby embrittling and reducing the volume of this portion. Then batches of the thus comminuted and at least partially embrittled and volume-reduced refuse are transported to a single treatment location. Here the batches of preprocessed refuse are mixed with each other and if desired with unprocessed refuse, and the mixture is sorted and comminuted again.

The method of the invention is based on the recognition that the step of relaxation of the stretched thermoplastics can be carried out outside the central processing location for plastic refuse so that as a result of the treatment of the refuse its characteristics are changed in a particular manner. These changed characteristics because of decreased volume advantageously affect the storage and transport volume and furthermore impart advantages with respect to subsequent treatment and preparation and they do not require any expensive high-investment or physically large machinery. The increased density of the refuse obtained by the decentral treatment advantageously affects the storage and transport as well as the further treatment steps of the refuse. By changing the physical properties, in particular as a result of the embrittlement, specific separation steps in the subsequently used central preparation of the collected refuse are substantially eased or made possible. With foams the storage or transport weight of the same volume is increased by a factor of 8 to 15, with fibers and films by a factor of 5 to 10, with deep-drawn and blow-molded parts by a factor of 2 to 5 with respect to the normally comminuted stretched thermoplastics.

The combined steps of comminution and relaxation according to the invention produce a fluent particulate mass which is easy to treat and transport. Compressing the old thermoplastics at the collection location, requiring an additional step and a corresponding machine, is made unnecessary according to the method of the invention.

With the method of the invention for most applications a particle size is needed which is determined as the plastic elements pass through a cutter, e.g. a shredder. According to application this comminution can take place before or after the relaxation process of the material being treated.

Thus the relaxation of the targeted stretched plastic to be sorted constitutes the central treatment step of the method of the invention. The thus obtained change in characteristics of the targeted thermoplastic are according to the instant invention used for further separating and sorting from the remaining laminated or mixed materials.

If in addition to the targeted thermoplastic there are further thermoplastics in the laminations or mixture the heating is carried out such that the thermoplastics to be sorted are selectively shrunk.

The agglomeration of plastic refuse by friction-induced heat according to the state of the art is not suitable for the method of this invention because with friction heating the targeted thermoplastic and other materials are comminuted so that the softened thermoplastics agglomerate, thereby making an accurate separation into different types harder.

An apparatus for collecting and treating refuse containing stretched plastics, in particular for carrying out the method of the invention, has for steps a) and b) a cutter with a plurality of roller- or disk-like blades, which if necessary contains a sieve with preferably adjustable gapping and that finally connected thereto is a heating zone that is united with the cutter to a single functional and structural unit.

With the apparatus according to the invention it is possible to reduce the collected volume of refuse of stretched thermoplastics in a technically simple manner and to facilitate the preparation and treatment. Thus by using the above-discussed physical characteristics or change in characteristics with the relaxation of stretched thermoplastics during their comminution and storing or bagging in a compact apparatus a preferable commercially interesting apparatus for carrying out method steps a) and b) is provided.

The particularly compact construction of the apparatus makes it possible to install it anywhere where refuse exists, for example in decentral collection locations such as apartment buildings, supermarkets, small businesses, or like organizations. The machine according to the invention is set up with respect to energy consumption such that it requires nothing more than a standard household energy supply and no further connections or special bases. It ensures no harmful emissions. The decentral use in the above-mentioned collection location further offers the advantage that large collection capacities need not be provided because the stretched thermoplastics are treated to be reduced in volume and can therefore be kept at the collection location before further transport.

The compact construction of the invention means it can also be transported in relatively light vehicles which can be taken to any location at which the thermoplastics to be recycled may be present in small quantities. This could for example be construction sites and/or businesses.

The apparatus can be set up such that it only has an on/off switch and is usable by anyone. To this end the apparatus is set up for use at locations that are open for consumers and other people. Thus the consumer or anyone can take care of packing materials of stretched thermoplastics directly and thus assist the recycling operation.

BRIEF DESCRIPTION OF THE DRAWING

The invention is shown in the schematic drawings in preferred embodiments, further details being drawable from the drawings. There is shown in.

SPECIFIC DESCRIPTION

Figure 1:
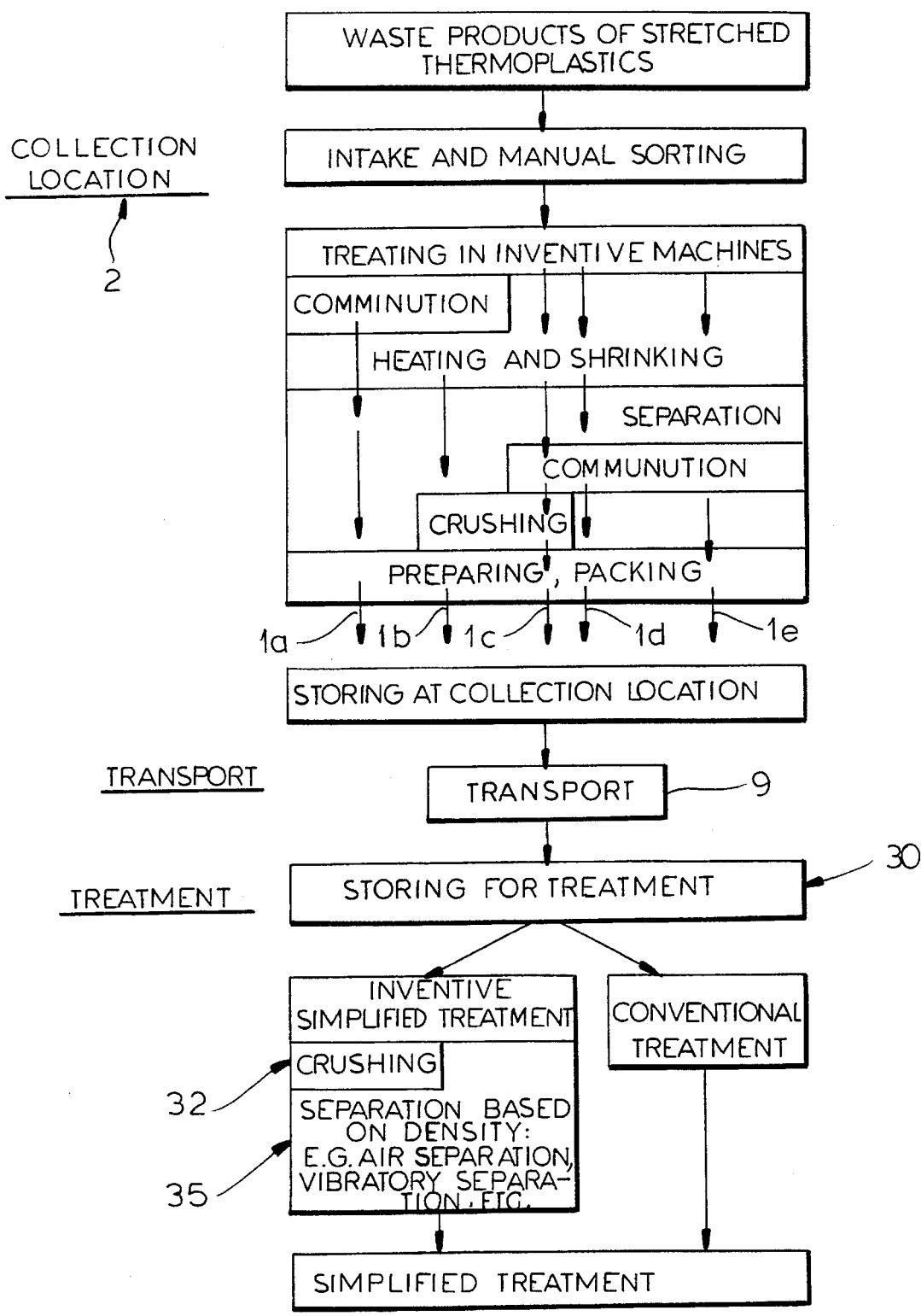
FIG. 1 the steps or combination possibilities as a purely schematic diagram.

According to the flow diagram in FIG. 1 various old things including elements of stretched thermoplastics are taken in at a collection location, for example at a large supermarket, and sorted manually. In a first path 1a for example connected molded parts of particle-EPS with glued-on paper, for example labels, are reduced by a two-shaft cutter, a so-called shredder, to a particle size of about 10 mm×20 mm×80 mm and then are run by a conveyor belt through an infrared heater so that the EPS is heated to about 105° C. The EPS shrinks and disattaches itself from the paper and lies separately or in poorly interconnected particles that result from the particulate makeup of the molded parts. The glue stays on the paper. The cooled mass is temporarily held at the collection location and is then transported for final treatment to the central treatment plant where the partially shrunk elements are crushed and comminuted by rollers and then subjected to a separation based on density differences, for example by means of air or vibration separation.

In another step sequence 1b during the production of packing and one-way waste from an EPS extruder with inner and outer paper layers some times additional PE-film stamping residues can occur which contain all components. These are comminuted and shrunk as in path 1a. The cooled mass is treated in the central treatment plant in the above-described manner. By subsequent shifting one can accurately sort out the EPS.

Corresponding to the path 1c a mass of waste fibers, as for example created by textile treatment, is so heated in a warming zone that the relaxation temperature of a targeted thermoplastic in the mass is reached. Such targeted thermoplastic-containing targeted thermoplastics can for example be various polyamides or even PET. The targeted thermoplastic relaxes and embrittles when cooled. The mass is then fed to a crusher for final treatment. The embrittled targeted thermoplastic is converted into defined small particles so that they are easily separated by sifting.

In the step sequence according to path 1d a laminated foil of two different thermoplastics or of a thermoplastic with paper or metal is heated in a heating oven such that the relaxation temperature of a targeted thermoplastic is reached. This type of targeted resin is here PE, PP, PA, PET. Shrinking before comminuting is particularly advantageous here because in this manner the entire possible shrink stress in the flat foil is use or freed. The shrunk targeted thermoplastic is after this treatment shaped as strip-or fiber-like and embrittled shapes sticking to the other component of the laminate. A subsequent comminution by crushing in a crusher converts the unshrunk laminate component during the final treatment into particles that can be sorted subsequently. During comminution the shrunk and embrittled portion of the targeted thermoplastic is mainly already separated from the other components of the laminate. To ensure complete separation of the laminate and a defined small particle size of the targeted thermoplastic there is a further treatment in an additional crusher. A subsequent sifting leads to the accurate separation of the targeted thermoplastic and the other components of the laminate.

And finally the path 1e is particularly suited for the same object as that described with reference to 1d. With such a combination of laminates already reduced to a sortable mass by comminution, the subsequent crushing by means of a crusher can be eliminated.

The method makes it possible to thermally pretreat hard plastic elements like fibers, films, foams, container or blister packings before a first working step a) and thus to selectively soften or embrittle them.

Furthermore the precomminuted particle mixture is subjected to a selective heating by convective heat and a density sorting for example in a hot-air fluidized bed.

According to one embodiment the precomminuted particle mixture is subjected to a selective heating by the heat of infrared radiation. Use can also be made of the procedure of selectively heating the precomminuted particle mixture by running it through a high-frequency field.

It is furthermore important that a mass brought to the relaxation temperature be intermediately cooled before being subjected to a further comminution. Embrittlement takes place during cooling. In most cases the cooling need only be to a temperature just under the relaxation temperature region. A further advantage is that the targeted thermoplastic has been rendered by relaxation and subsequent cooling into a fluent mass of particles whose brittleness is particularly suited for subsequent treatment.

To this end according to one embodiment a mass containing shrunk and embrittled and other particles can be selectively comminuted by means of impact comminution. An alternative of the method is that a mass containing shrunk and embrittled and other particles can be comminuted by crushing as it runs between the rollers of a two-roller crusher so that as a result of an accurate setting of the roller gap one sets the particle size of the comminution product.

According to an embodiment of the method sifting is used to sort the mass of particles which have been embrittled and selectively comminuted into fractions including the targeted plastic and other plastics or materials.

According to an alternative embodiment of the method sorting of the mass of embrittled and/or comminuted particles is effected by means of different methods such as air sorting, magnetic sifting, swim/sink separation, vibration, or a combination of these methods.

Finally the method provides that unsuitable items can be sorted from the refuse before the first preparing step a) by scanning or manual sorting.

Figure 2:
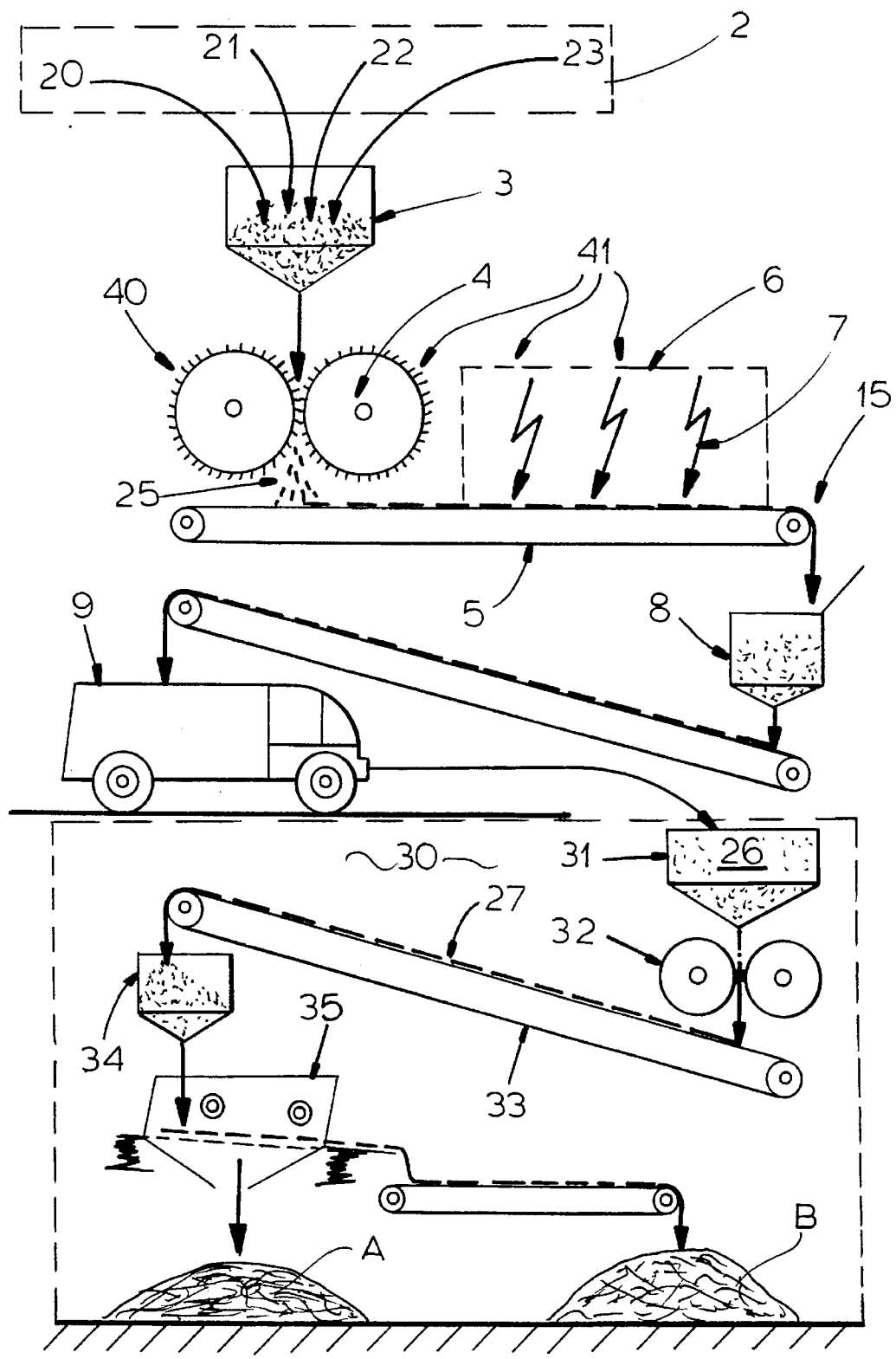
FIG. 2 a depiction of the method steps in simplified form.

A flow diagram which also is a simplified apparatus illustration is shown in FIG. 2. An outside collection location 2, a public or private-sector operation, takes in plastic refuse 20, 21, 22, 23 which may include packing materials such as films, foams, molded parts such as bottles, containers, disposable eating utensils or the like which can partly come from construction jobs and stores it in a holder or container 3. As soon as a quantity of the refuse is present that is sufficient to justify a further treatment, it is fed into a shredder 4 and reduced thereby to particles or foam bits 25. This type of comminution in a relatively slowly rotating cutter 4 has the advantage that the plastic parts 20 to 23 along with the foreign material and dirt clinging to them is reduced with little expenditure of energy to a particle size that produces good fluency after shrinking. The particles or bits 25 are now moved by a transport device 5 through a heating region 6 and thus heated to the relaxation temperature of the stretched plastic component. Heating is such that a portion of the stretched plastic shrinks individually with melting together. This effect can be augmented when instead of a conveyor belt as the transport device 5 a vibratory conveyor is used. The heat source 7 can be a hot-air blower, an infrared source, or a high-frequency vibration field. Alternatively shrinking in a hot-air or medium fluidized bed is possible. In the last cases for example foam rubber or other plastic particles are put into a fluidized bed where they are heated and shrunk. When they reach a predetermined density they drop down through the fluidized bed and are taken out. In general the shrinking of the particles produces a fluent particulate mass which is very advantageous for the further treatment steps including transport, not to mention the comminution of steps a) and heat treatment of step b) as well as changes of the physical characteristics. The product 15 of comminuted and thermally treated material coming from the heating stage 6 is fed to a collecting container 8 and then transported to a central treatment plant 30 by a transporting vehicle 9.

At the central treatment plant 30 the particle mixture 26 containing a fraction of shrunk and embrittled plastic particles of one type and at least one further fraction of unshrunk particles of one or several other types of plastics as well as a balance of foreign material such as paper and the like is put in a collecting container 31 and there homogenized by an (unillustrated) mixer with other loads. As it exits the collecting container 31 the particle mixture 26 runs through a roller crusher 32 of a comminuter where the particles or bits 15 that have been precomminuted and shrunk in the heater 6 and then embrittled by subsequent cooling are subjected to a selective comminution.

The selective comminution is a process whereby the preferably embrittled and shrunk particles of the original stretched part of the mixture of plastics are subjected to a special type of comminution or a subsequent comminution by squeezing or impacting, while the types of plastics, for instance plastics that are unstretched or that have high relaxation temperatures so that they are unaffected by the heat treatment, are only limitedly comminuted. The thus produced particle mixture 27 is moved by a conveyor 33 in the treatment plant to an intermediate container 34 and is finally sorted by a sorting device 35 into different fractions A and B. The type of sorting device depends on the characteristics of the material. For example it can as shown in FIG. 2 be a sifting machine, but it can also be a device for air classification, magnetic classification, and or flotation classification. In addition the particle mixture 27 can be sorted in succeeding sorting devices with a combination of the same into several fractions. Such further embodiments are not shown in the diagram of FIG. 2 for the sake of clarity.

As shown in FIG. 2 the cutter 4 has a plurality of roller-shaped or disk-shaped blades 40 that are spaced to if necessary form a sifter with an adjustable gap.

Figure 3:
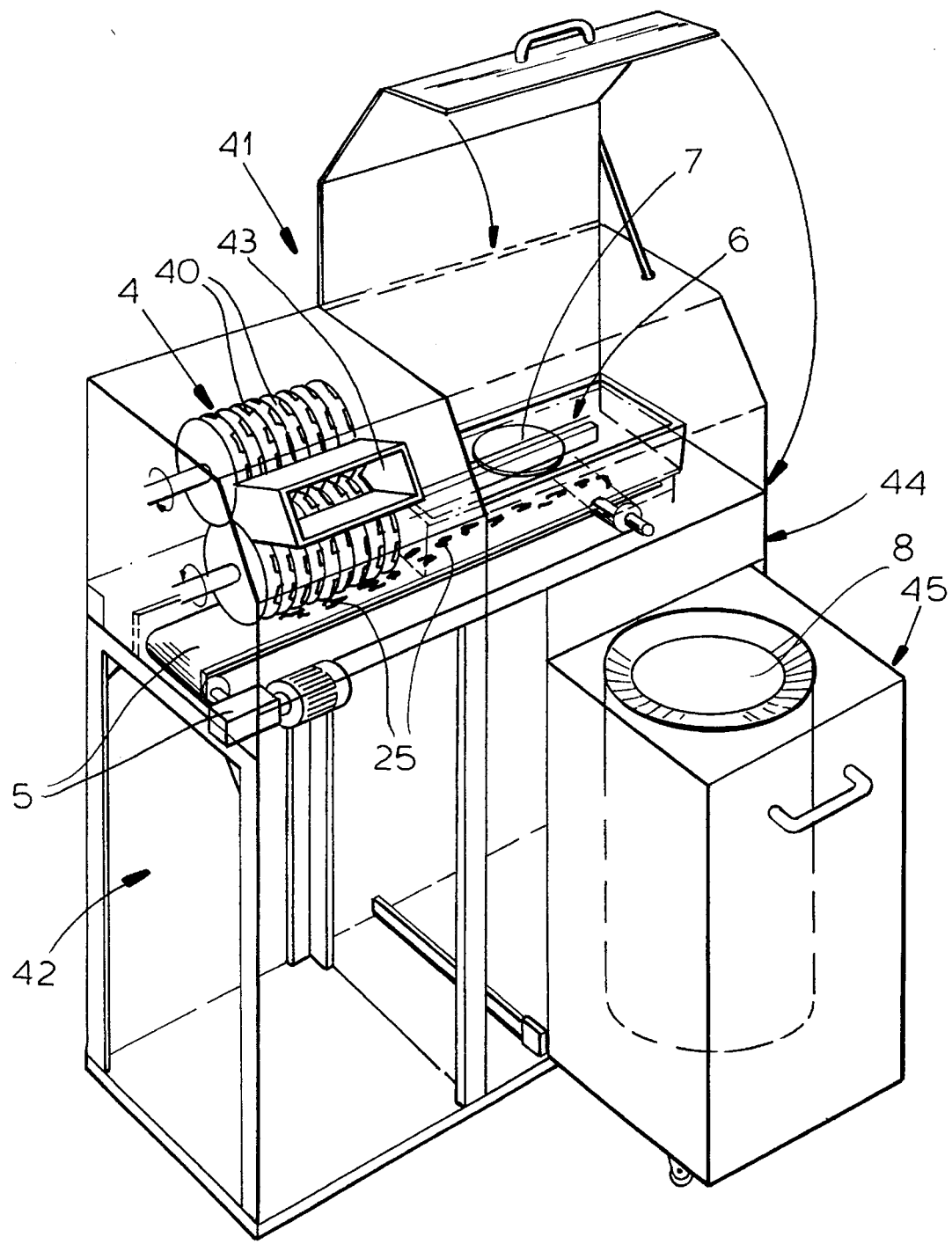
FIG. 3 an apparatus for carrying out steps a) to b).

According to an important aspect of the invention the cutter 4 and the heater 6 and the conveyor 5 are united as a functionally and structural single unit 41 as shown in FIG. 3. This has generally very compact construction like a cupboard. A first housing part 42 holds the shredder 4 with the blades 40. This part has an intake port 43 through which a wholly untrained person, that is no specialist, can throw in without danger plastic parts such as cups, bottles, foam and the like so thus are comminuted by the shredder. The thus comminuted particles or bits 25 are moved by the conveyor 5, a heat-resistant conveyor belt, through the heater 6 and thus are heated up by the heat source 7. This is held in the second housing part 44 where at the downstream end of the conveyor 5 is a collecting container 8 held in a drawer 45 that can be pulled out. Periodically service personal empty this into a larger container and then subsequently according to the illustration of FIG. 2 it is transported by a vehicle 9 periodically to the central treatment plant 30.

At the central treatment plant 30 the embrittled particles 26 are converted as described above into a very limited particle size. Unshrunk and therefore not embrittled plastic elements of other types as well as labels, paper, or adhesive residues which in practice are generally also comminuted in the machines according to the invention are not comminuted in the comminuting device 32 according to the invention, a two-roller crusher. Instead it is possible for example by means of a simple sifting or other suitable separation by an air classifier or vibratory separator to separate these foreign materials from the targeted thermoplastics. In this manner one obtains a pure fluent old-plastic fraction A which in this form can be recycled. The other fraction B either holds another type of plastic or several types of plastic with dirt which subsequently as desired is sorted into further fractions or disposed of.

For use of the refuse 2 at decentralized locations the compact construction of the integrated unit 41 according to FIG. 3 with cutter 4, heater 6, and container 8 in a cupboard-like housing 42, 44, 45 is particularly advantageous because it can be used anywhere that refuse exists, in all out-of-the way collection locations for example in the common areas of large apartments, at markets of goods and the like. It is thus possible to make surface-covering collections for example at packing locations, without which a really practical recycling of plastic refuse is not possible. The compact unit 41 of this invention does not use much more energy than other normal household machines, as for example a washing machine, and can be used by any lay person without previous instruction. The preparatory steps a) and b) before the final treatment in the central treatment plant lead to a separation of laminated materials and the subsequent recovery of a fraction of the targeted plastic. As is known there is an at least partial delamination with some types of laminates already during the comminution. A requirement for this is an adequately weak bond of at least one of the layers. It has surprisingly been learned that the selective relaxation of layers which have a targeted thermoplastic leads to a substantial delamination. This is probably because the shrink tension released by the relaxation is effective on the interface between the layers and serves to a softening of the adhesion and a peeling off of the shrinking components. Even during further sorting which is normally assisted mechanically by vibration, impacting, or the like a separation of the already embrittled targeted thermoplastic takes place. This can result in delamination with the method of the invention according to composition and structure of the material as well during method steps a) and b) as also during method steps c) and d).

Sorting the targeted thermoplastics from the mixture is the last method step. The previous method steps serve to convert the mass or the lamina into such a form that the targeted thermoplastic therein is present as small particles while the other components of the mixture have the size determined by the initial comminution.

With the ever increasing future expectations of sorting methods for old products there will be at several locations quantities of old materials or products. There are already intake locations which are responsible for product groups of specific types, e.g. polystyrol foams (EPS). In the sorting for example cups and blister packs or hollow bodies are set aside as a single fraction. Such selections of old materials, which can contain other materials than plastics, are produced by unwrapping products, for example vehicular or household devices. The basic requirement for old-material selections or laminates according to the invention is that only such materials will be permitted that are not already too brittle so that during the method they are further embrittled so that they become small particles as the targeted thermoplastics are processed according to the invention and as a result become difficult to sort. On the other hand the inventive method can be used to treat such refuse which contains in addition to the selectively releasable targeted thermoplastic other non brittle plastics, paper, or thin-walled metal parts such as aluminum foil. The particularly ideal targeted plastics are for example PS and PS compounds, PET, PA, CA as well as PE, PP, and PVE so long as the latter has not been constituted as soft elastic. The presorted fractions can contain other materials in addition to the targeted thermoplastic. These can at a later date be separated out in a further treating or sorting step if they cannot remain in the secondary product.

The invention relates—as described above—among other things to the treatment of types of plastic laminates, parts of laminates, laminated products or the like which also are mixed with foreign materials as the starting material.

The starting material is put into a bed of a single-frequency conveyor and there is heated as it is transported to the temperature necessary to relax the thermoplastics to be sorted. During the relaxation the desired delamination and/or reduction of volume of the thermoplastics being sorted takes place. Then downstream of this heated conveyor the conveyed material is dropped onto another conveyor that is provided with a sieve (perforated plate). Even the conveyor that is used for the heating can be provided with a sieve so that shrunk particles drop directly at the conveyor through the sieve. The relaxed thermoplastic particles fall through the sieve while all other materials are transported downstream. The relaxed thermoplastic is thus taken out separately.

If the starting material contains several stretched thermoplastics of different types they can separated out of the mass by running through several cascaded conveyor paths according to the invention each operating at the characteristic relaxation temperature for the thermoplastics.

For example expanded rubber bits, as for example from the comminution of foam products, are being treated. The starting material contains PS, PE, PP, PU and even mineral foams. The particle size is made with the use of a comminuting system to about 10×30×20 mm.

An auger conveyor is used which has three heating zones with respective following sieves. In the first heating zone the starting material is heated to 100° to 105° C. so that the PS bits shrink. As a result of the vibration the bits always shrink as individual particles. In the following sieve the PS is sifted out. In the next heating zone the temperature is raised to 135°–140° C. so that the PE shrinks and is sifted out in the following sieve. In the third heating zone PP is shrunk at 150° C.–160° C. and subsequently is sifted out. The sifted-out fractions can be further prepared according to the invention.

The left-over fractions contains the PU and mineral foam bits as well as any labels or tape which earlier was bonded with the separated foams. All the thermoplastics are sorted out and can be sent to a clean-sorted recycling plant.

I claim:

1. A method of treating refuse containing stretched plastic, the method comprising the steps of:
   at each of a plurality of collection locations
      a) collecting the refuse;
      b) heating the collected refuse to a relaxation temperature of at least a portion of the stretched plastic to shrink the volume of and embrittle the portion;
      c) comminuting the collected refuse; and
      d) collecting the comminuted, partially shrunk, and partially embrittled refuse into a batch;
   thereafter transporting the batches of comminuted, partially shrunk and embrittled refuse to a single treatment location separate from the collection locations;
   at the treatment location
      e) mixing the batches with each other;
      f) comminuting the mixture; and
      g) sorting the comminuted batches into separate fractions.

2. The refuse-treatment method defined in claim 1 wherein step b) precedes step c).

3. The refuse-treatment method defined in claim 2, further comprising the step between steps b) and c) of
   b') cooling the embrittled and shrunk refuse.

4. The refuse-treatment method defined in claim 1 wherein step b) is carried out in a fluidized bed.

5. The refuse-treatment method defined in claim 1 wherein step b) is carried out by heating the collected refuse with a high-frequency field.

6. The refuse-treatment method defined in claim 1 wherein in step b) the collected refuse is heated by infrared radiation.

7. The refuse-treatment method defined in claim 1 wherein step c) is effected by running the collected refuse through a two-roller crusher having a gap establishing particle size.

8. The refuse-treatment method defined in claim 1 wherein step g) is effected by sifting.

9. The refuse-treatment method defined in claim 1 further comprising after step a) and before steps b) and c) the step of
   a') sorting the collected refuse and separating from it unwanted items.

10. A system for treating refuse containing stretched plastic, the system comprising:
    at each of a plurality of collection locations at which refuse is collected a single apparatus comprising
       means for heating the collected refuse to a relaxation temperature of at least a portion of the stretched plastic to embrittle and shrink the volume of the portion;
       means including a plurality of blades for comminuting the collected and heated refuse; and
       means including a holding container for collecting the comminuted, partially shrunk, and partially embrittled refuse into a batch;
       means for transporting the batches of comminuted, partially shrunk and embrittled refuse to a single treatment location separate from the collection locations;
    at the treatment location
       means for mixing the batches with each other;
       means for comminuting the mixture; and
       means for sorting the comminuted batches into separate fractions.

11. The refuse-treatment system defined in claim 10 wherein the apparatus has a conveyor extending from the heating means to the comminuting means.

12. The refuse-treatment system defined in claim 10 wherein the heating means includes an infrared heater.

13. The refuse-treatment system defined in claim 10 wherein the means for comminuting the mixture includes an impact comminuter.

* * * * *